Sept. 8, 1959  F. DIDSZUNS  2,903,109
MAGNETIC MATERIAL FORCE TRANSMITTING DEVICE
Filed Dec. 27, 1954
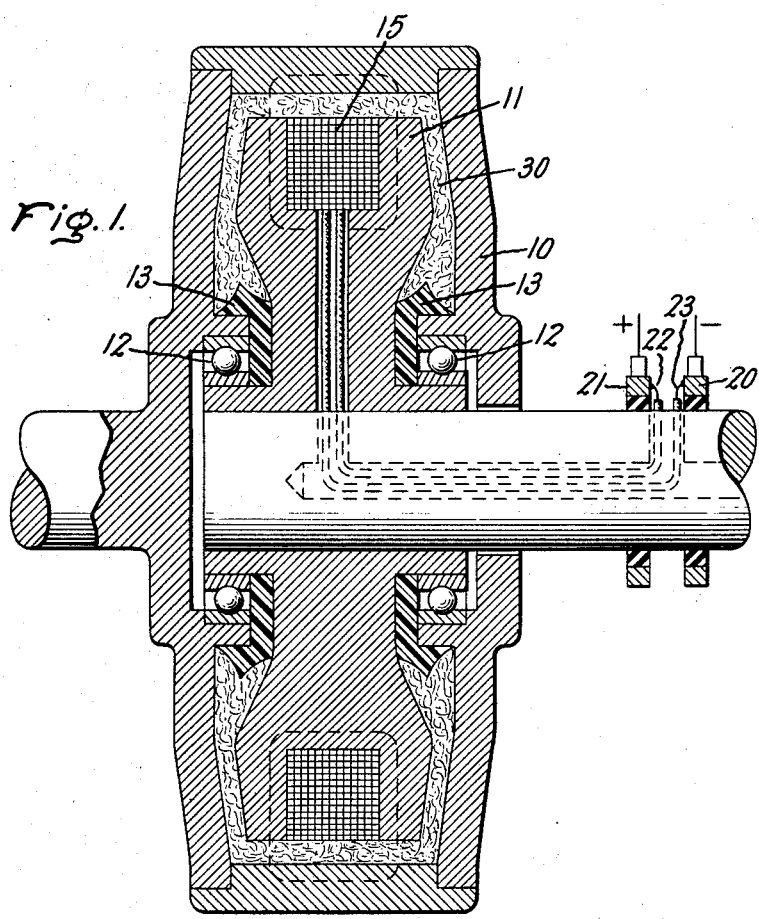
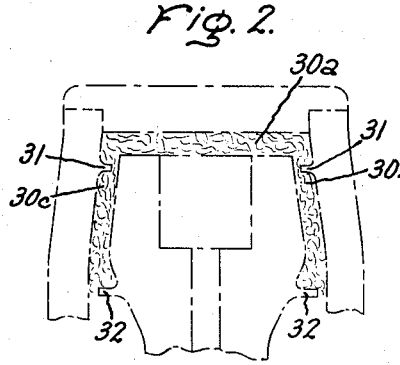
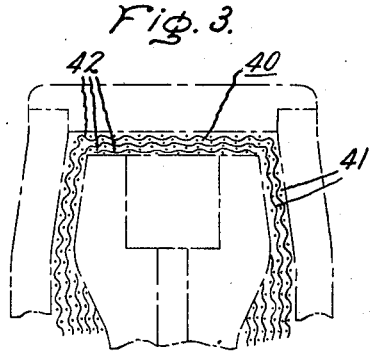
Inventor:
Fritz Didszuns,
by *Claude H. Mott*
His Attorney.

United States Patent Office 2,903,109
Patented Sept. 8, 1959

2,903,109

MAGNETIC MATERIAL FORCE TRANSMITTING DEVICE

Fritz Didszuns, Schenectady, N.Y., assignor to General Electric Company, a corporation of New York Application December 27, 1954, Serial No. 477,833

7 Claims. (Cl. 192—21.5)

This invention relates to magnetic material force transmitting devices of the type having relatively movable force transmitting members defining an air gap between them and in which an electromagnetic field acts on magnetic material disposed within the air gap to cause force transmission.

In the past the magnetic material mixture in the air gap of such devices, e.g. clutches, has comprised magnetic particles, for example, iron, and some type of lubricant, either wet or dry, for example, oil, graphite, lamp black, etc. Several problems have arisen in connection with this type of magnetic particle mixture in the air gap. One of these problems has been that it is difficult to prevent loss of the magnetic mixture from the air gap due to rotation and vibration of the clutch members. Another vexing problem has been the difficulty in finding satisfactory way to prevent leakage of the magnetic particle mixture into the bearings and the resultant wear and deterioration of the bearings. A problem existing with the use of dry particle mixtures has been the packing or wedging of the powder or mixture between the force transmitting members as described more fully in the copending application of the same inventor, Serial No. 477,665, filed December 27, 1954, entitled "Magnetic Powder Mixture for Force Transmitting Devices" and assigned to the assignee of the present application.

It is thus an important object of this invention to overcome the problems and disadvantages set forth above.

Another object is to provide a force transmitting device of the type described in which the problem of loss of magnetic particle mixture from the air gap is substantially eliminated.

Another object is to provide such a device which is rotatable and in which the leakage of any magnetic particles into the bearings is greatly reduced.

Another object is to provide a clutch having a magnetic material mixture which is much less likely to pack or wedge between the rotatable clutch members.

Briefly stated in accordance with one aspect of this invention, a magnetic material force transmitting device including rotatable magnetic force transmitting members cooperating to define an air gap therebetween is provided which employs magnetic flux passing through magnetic material in the air gap to cause force or torque transmission. A flexible, fibrous material, at least part of which is magnetic material, is disposed within the air gap to make up the magnetic material mixture.

The invention will be better understood and additional objects and advantages thereof will become apparent upon perusal of the following description taken in connection with the drawing, and the scope of the invention will be pointed out in the appended claims.

In the drawings Fig. 1 is a view in cross section of a clutch embodying the principles of this invention;

Fig. 2 is a fragmentary sectional view partly in phantom of a similar clutch, but showing a different embodiment of this invention;

Fig. 3 is a view like Fig. 2, but showing a third embodiment of this invention.

Referring more particularly to the drawings, which are illustrative of the principles of the invention, a magnetic material force transmitting device may be seen in the form of a clutch comprising a pair of relatively movable magnetic torque transmitting members. These members as illustrated comprise an external rotating member 10 and in internal rotating member 11 supported in bearings 12 without axial thrust. These ball bearings are sealed as by gaskets 13 from the interior of the clutch. The rotating member 11 is of paramagnetic material and carries the flux producing winding in the form of an annular coil 15 arranged coaxially with the shafts. Two slip rings 20 and 21 carry the energizing current which may be A.C. or D.C. to the coil 15 by leads 22 and 23.

The external rotating member 10 of the clutch comprises a hollow housing at least part of which furnishes the magnetic reutrn path for the coil flux, the path being shown in dotted lines in Fig. 1. It will be observed that the pair of relatively movable clutch members are so constructed and arranged as to define an air gap between them.

A flexible, fibrous material, at least part of which is magnetic material, is disposed within the air gap. This flexible, fibrous material may be made from all magnetic materials or from a combination of magnetic and non-magnetic materials. Also, the flexible fibrous material may be used by itself within the air gap or it may be used in conjunction with a magnetic or a non-magnetic powder.

In operation upon energization of the coil 15, a magnetic flux is created across the air gap causing magnetic orientation of the flexible fibrous material 30 and the consequent transmission of torque between the clutch members 10 and 11. Upon deenergization of the coil 15, the material 30 resumes substantially its original position with little or no packing or wedging effect.

The magnetic material within the air gap may take the form of a plurality of flexible, fibrous material masses as illustrated in the embodiment shown in Fig. 2. Thus, non-magnetic separators 31 and 32 may be provided as projections from the inner walls of the outer rotating member 10 and from the outer walls of the inner rotating member 11, these separators projecting into the air gap to separate one flexible fibrous material mass 30a from similar masses 30b and 30c. Alternatively the air gap occupied by the fibrous material mass 30a could be filled with a magnetic powder of the type disclosed in the copending application referred to above.

Another alternative embodiment is illustrated in Fig. 3. In this embodiment, the flexible fibrous material is in woven form and is similar in appearance to commercially available steel wool. In the Fig. 3 embodiment, the flexible, fibrous material 40 comprises woven strands 41 and 42.

While particular embodiments of the invention have been illustrated and described, modifications thereof will readily occur to those skilled in the art. For example, it should be clear that the invention is useful in magnetic particle brakes or other force transmitting devices as well as to clutches as shown. It should be understood therefore that the invention is not limited to the particular arrangements disclosed but that the appended claims are intended to cover all modifications which do not depart from the true spirit and scope of the inveniton.

What is claimed as new and desired to be secured by United States Letters Patent is:

1. A magnetic material force transmitting device of the type employing magnetic flux passing through magnetic material in the air gap to substantially solidify it to cause torque transmission, said device comprising a pair of relatively movable magnetic force transmitting members so constructed and arranged as to define an air gap therebetween, a flexible, fibrous material mass at least part of which magnetic material freely disposed in and at least partially filling the air gap, and means for selectively creating an electromagnetic field across said air gap to create a magnetic bond between said members through the medium of said mass.

2. In a magnetic material clutch including rotatable magnetic clutch members ccooperating to define an air gap therebetween and employing magnetic flux passing through magnetic material in the air gap to substantially solidify it to cause torque transmission, the improvement comprising the use of material which is in the form of a flexible, fibrous mass at least part of which is magnetic material freely disposed in and at least partially filling the air gap.

3. A magnetic material force transmiting device comprising a pair of relatively movable magnetic force transmitting members so constructed and arranged as to define an air gap therebetween, a flexible, fibrous material mass at least part of which is magnetic material freely disposed in and at least partially filling the air gap, said mass having substantial resiliency, and means for selectively creating an electromagnetic field across said air gap to create a magnetic bond between said members through the medium of said mass.

4. A device as set forth in claim 1, said fibrous mass having a woven construction.

5. A device as set forth in claim 2, said flexible, fibrous mass forming the sole physical contact between said members.

6. A magnetic material force transmitting device comprising a rotatable driving member, a rotatable driven member, said members having surfaces cooperating to form an air gap, a magnetic material mixture freely disposed in said air gap, said mixture comprising a flexible fibrous mass at least part of which is magnetic material, means for producing an electro-magnetic field across the air gap to create a magnetic bond between said members, said field acting to substantially solidify said magnetic material mixture and cause torque transmission.

7. A device as set forth in claim 6, said flexible, fibrous mass forming the sole physical contact between said members.

References Cited in the file of this patent

UNITED STATES PATENTS

| | | |
|---|---|---|
| 2,532,876 | Asche et al. | Dec. 5, 1950 |
| 2,580,869 | Winther | Jan. 1, 1952 |
| 2,660,640 | Wolf | Nov. 24, 1953 |
| 2,692,843 | Winther | Oct. 26, 1954 |
| 2,693,261 | Winther | Nov. 2, 1954 |
| 2,738,044 | Winther | Mar. 13, 1956 |
| 2,772,762 | Gamundi et al. | Dec. 4, 1956 |

FOREIGN PATENTS

| | | |
|---|---|---|
| 505,922 | Great Britain | May 19, 1939 |